US006161953A

United States Patent [19]

Chouji et al.

[11] Patent Number: 6,161,953

[45] Date of Patent: Dec. 19, 2000

[54] VEHICLE LAMP

[75] Inventors: Masataka Chouji; Takashi Sone, both of Shizuoka, Japan

[73] Assignee: Koito Manufacturing Co., Ltd., Tokyo, Japan

[21] Appl. No.: 09/165,293

[22] Filed: Oct. 2, 1998

[30] Foreign Application Priority Data

Oct. 3, 1997 [JP] Japan .................................... 9-270956

[51] Int. Cl.[7] ............................... B60Q 1/00; F21V 17/00

[52] U.S. Cl. ........................... 362/546; 362/507; 362/455

[58] Field of Search ..................................... 362/546, 507, 362/311, 351, 455

[56] References Cited

U.S. PATENT DOCUMENTS

| | | | |
|---|---|---|---|
| 4,931,912 | 6/1990 | Kawakami et al. | 362/61 |
| 5,497,299 | 3/1996 | Wisler et al. | 362/351 |
| 5,556,584 | 9/1996 | Yamazaki et al. | 264/46.5 |
| 5,560,706 | 10/1996 | Yamazaki et al. | 362/267 |
| 5,607,228 | 3/1997 | Ozaki et al. | 362/263 |
| 5,707,134 | 1/1998 | Nishizawa | 362/66 |

FOREIGN PATENT DOCUMENTS

| | | | |
|---|---|---|---|
| 735309 | 5/1966 | Canada | 362/311 |

*Primary Examiner*—Audrey Chang
*Assistant Examiner*—Jennifer Winstedt
*Attorney, Agent, or Firm*—Sughrue, Mion, Zinn, Macpeak & Seas, PLLC

[57] ABSTRACT

A vehicle lamp in which a sealing groove is formed circumferentially in the inclined front opening of a lamp body for containing a light source 14 and the sealing leg of a front lens engages integrally with the sealing groove via a sealing material is such that the base of the sealing groove in cross section is sloped with respect to a plane perpendicularly intersecting the direction of inserting the sealing leg and that on the inclined base, there are provided cross projections and extending in the direction of intersecting the sealing groove in order to prevent the sealing leg from sliding in the width direction of the sealing groove. When the sealing leg is forced in, it is brought into contact with the cross projections and prevented from being inserted to a degree exceeding a predetermined quantity. As each of the cross ribs making contact with the sealing leg intersects the direction of inserting the sealing leg, there is no possibility that the sealing leg is caused to slide in the width direction of the sealing groove.

1 Claim, 7 Drawing Sheets

VEHICLE LAMP

BACKGROUND OF THE INVENTION

1. Field of the Invention

The present invention relates to a vehicle lamp in which the sealing leg of a front lens engages integrally through a sealing material with the sealing groove of a lamp body.

2. Related Art

FIG. 7 shows one example of a conventional vehicle lamp of the type as stated above. The conventional vehicle lamp includes a headlamp in which a front lens 4 is incorporated with the front of a vessel-like lamp body 1 for housing therein a reflector 2 mounted with a bulb 3. A sealing leg 7 formed on the peripheral edge of the front lens 4 is brought into engagement with a sealing groove 5 formed in the front opening of the lamp body 1 via a sealing material 8. The sealing material 8 seals up the inside of the sealing groove 5, whereby a waterproof structure is formed between the front lens 4 and the lamp body 1.

The front lens 4 is also provided with a flange 7*a* formed on the outer side of the sealing leg 7. The stroke of insertion of the sealing leg 7 into the sealing groove 5 is defined when the flange portion 7*a* comes into abutment against the front edge of the outer side wall 5*a* of the sealing groove 5.

Recent demand is that the front opening of the lamp body 1 largely slopes backward or the front lens 4 substantially slopes toward the side of a vehicle so as to harmonize the external configuration of lighting fixtures with the streamline of a vehicle body 9, whereby to decrease air resistance and to seek novelty.

In the aforesaid conventional vehicle lamp, as shown in FIGS. 8 and 9, a base 5*b* of the sealing groove 5 slopes in harmony with the slope of the front opening of the lamp body 1 so that the depth of the sealing groove 5 is made constant in the widthwise direction of the groove. The base 5*b* of the sealing groove 5 slopes with respect to a plane $F_1$ perpendicularly intersecting the direction $P_1$ in which the sealing leg 7 is inserted when brought into engagement with the sealing groove 5.

Hence, as shown in FIG. 9, the outside wall 5*a* of the sealing groove 5 is forced to expand if the sealing leg 7 is pressed into the sealing groove 5 relatively strong when inserted therein and the sealing leg 7 is inserted up to a position where the sealing leg 7 is brought into contact with the base 5*b* of the sealing groove 5. If the sealing leg 7 is thus pressed against the inclined base 5*b*, the sealing leg 7 is caused to slide (see the two-dotted line of FIG. 9) in the widthwise direction of the groove 5 (direction $P'_1$ in FIG. 9) along the inclined base 5*b* due to components of the pressing force applied along the inclined base 5*b*.

Consequently, there develops nonconformity resulting in causing the sealing material 8 to be forced out of the sealing groove 5 and become soiled, reducing sealing performance because the thickness of the layer of the sealing material 8 becomes irregular in the cross sectional direction of the sealing groove 5, making unobtainable desired proper light distribution in a headlamp in which light distribution is effected by means of the light-distribution control step of the front lens 4 and so forth.

SUMMARY OF THE INVENTION

An object of the present invention made in view of the foregoing problems accompanying the conventional art is to provide a vehicle lamp in which a sealing leg can be brought into proper engagement with a sealing groove.

The above object can be accomplished by a provision of a vehicle lamp which, according to the present invention, includes a sealing groove formed circumferentially in the inclined front opening of a lamp body for containing a light source. The sealing leg of a front lens is brought into engagement integrally with the sealing groove via a sealing material so that the base of the sealing groove in cross section slopes with respect to a plane perpendicularly intersecting the direction of inserting the sealing leg and that on the inclined base. There are provided cross projections perpendicularly intersecting the direction of inserting the sealing leg and extending in the direction of intersecting the sealing groove in order to prevent the sealing leg from sliding in the width direction of the sealing groove.

Air resistance in an area ranging from a vehicle body up to the lamp is made reducible by sloping the front opening of the lamp body and the front lens in harmony with the slope of the vehicle body.

Since the depth of the sealing groove, that is, the depth of the sealing material in the sealing groove is made uniformly along the sealing groove by forming the base of the sealing groove in cross section in parallel to the inclined front opening of the lamp body, so that sealing performance between the sealing leg and the sealing groove can be made uniformly along the sealing groove.

When the sealing leg is forced to be inserted into the sealing groove, moreover, it is brought into contact with the cross projections provided on the base of the sealing groove and prevented from being inserted further. As the cross projections thus brought into contact with the sealing leg extend in the widthwise direction of the sealing groove perpendicularly intersecting the direction of inserting the sealing leg, there is no possibility that the sealing leg is allowed to slide in the width direction of the sealing groove because a component of force applied in the width direction of the sealing groove in which the cross projections extend do not act even when the sealing leg is pressed against the cross projections.

According to another aspect of the present invention, the front edge face of the sealing leg is made substantially parallel to the base of the sealing groove in such a state that the sealing leg is kept in engagement with the sealing groove.

Since the front edge face of the sealing leg and the base of the sealing groove are substantially parallel to each other, the thickness of a sealing material layer is made uniformly in the cross sectional direction of the sealing groove and sealing performance in the cross sectional direction of the sealing groove is thus improved.

According to another aspect of the present invention, the cross projections are provided so that each of them holds the lamp body between both its opposite sides and ensures that both side portions of the sealing leg holding the lamp body never slide in the width direction of the sealing groove.

According to still another aspect of the present invention, the vehicle lamp further includes a flange formed on the outer side the sealing leg for setting the stroke of insertion of the sealing leg by making contact with the front edge of the outer side wall of the sealing groove.

Since the flange portion on the sealing leg side is brought into contact with the front edge of the outer side wall of the sealing groove so as to set quantity of insertion of the sealing leg in the sealing groove, the sealing leg inserted into the sealing groove is prevented from being brought into contact with the projection on the base of the sealing groove and therefore the sealing leg is not forced in more than necessary.

According to another aspect of the present invention, each cross projection is in the form of a trigonal pyramid whose ridgeline directs toward the opening of the sealing groove. Although the sealing material layer held between the sealing leg and the cross projections is extremely thin, the thin region of the sealing material layer is equivalent to only a region corresponding to the ridgeline of each cross projection in the form of a trigonal pyramid intersecting the sealing groove and therefore the sealing performance in the sealing groove remains unaffected thereby.

DESCRIPTION OF THE PREFERRED EMBODIMENT

A preferred embodiment of the present invention will now be described with reference to accompanying drawings.

Figure 1:
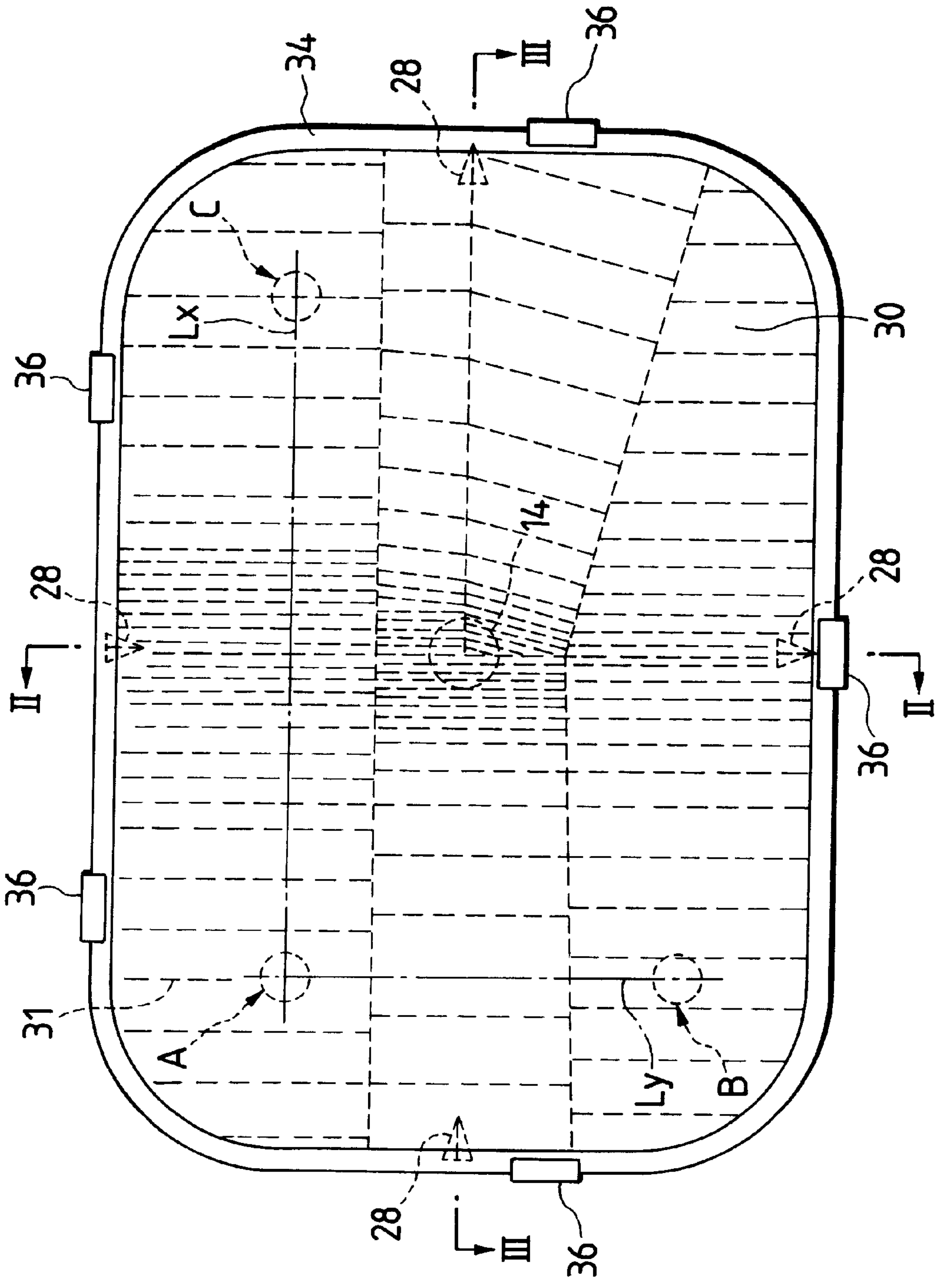
FIG. 1 is a front view of an automobile headlamp embodying the present invention.
Figure 2:
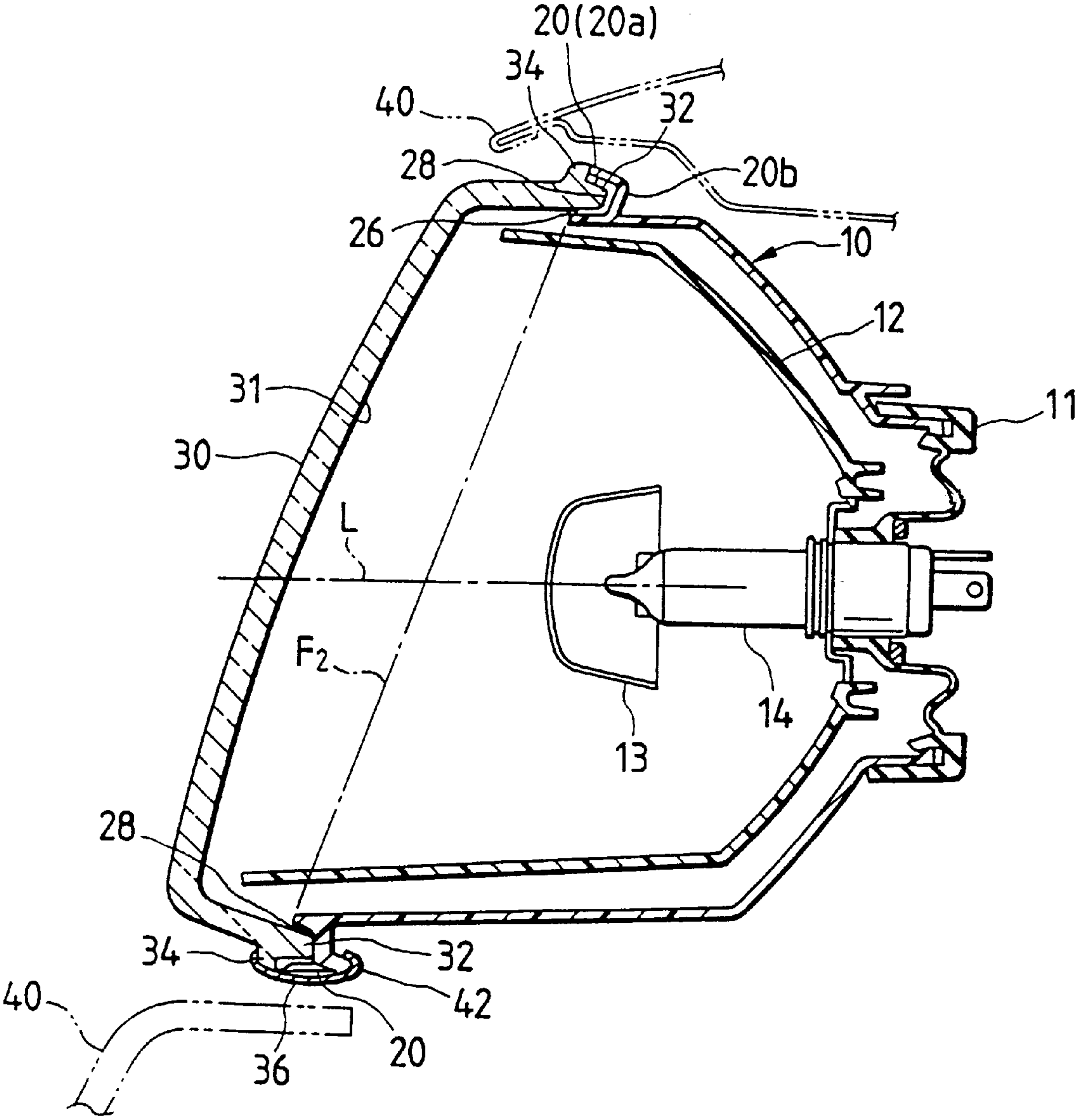
FIG. 2 is a vertical sectional view of the headlamp taken along a line II—II of FIG. 1.
Figure 3:
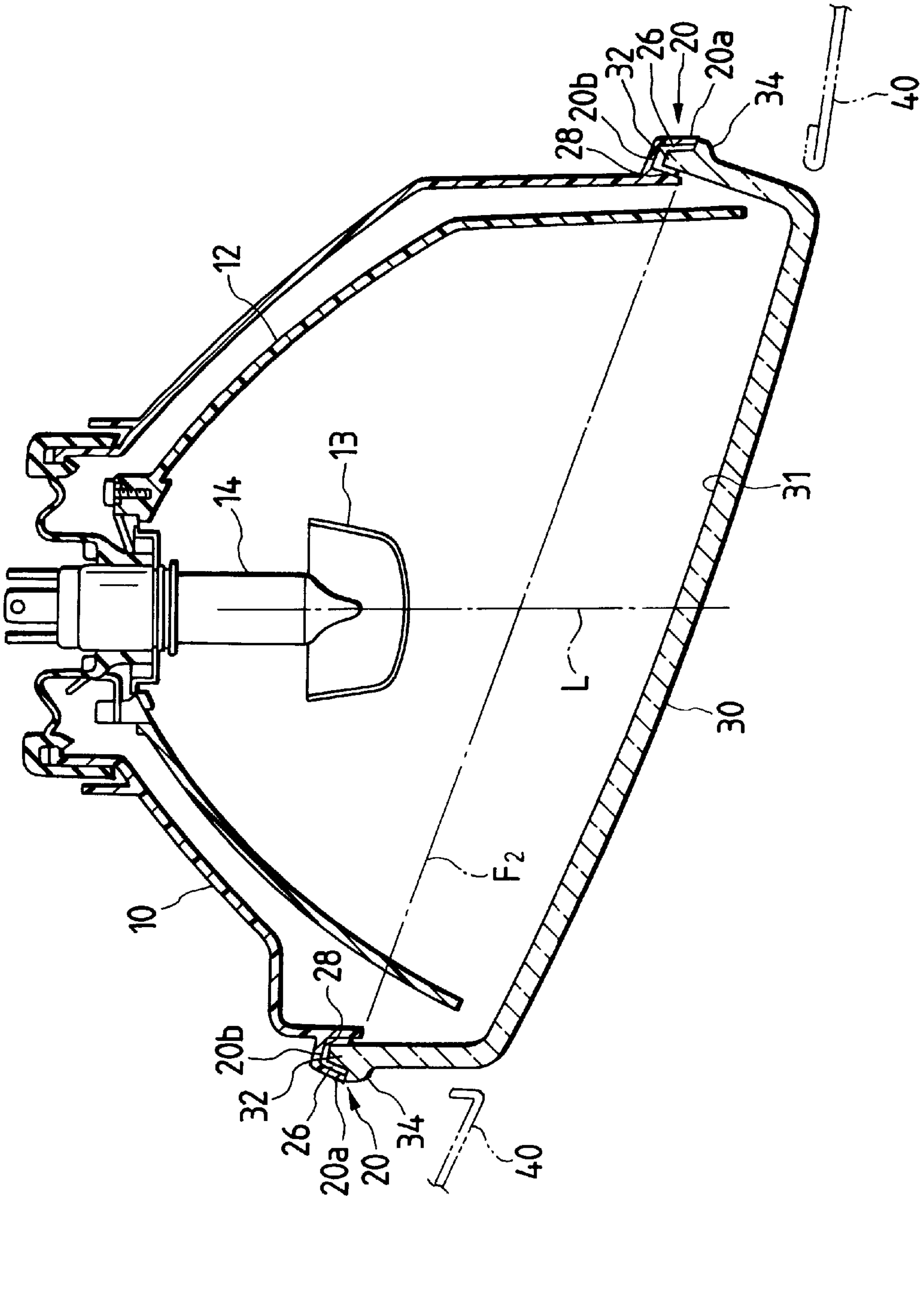
FIG. 3 is a horizontal sectional view of the headlamp taken along a line III—III of FIG. 1.
Figure 4:
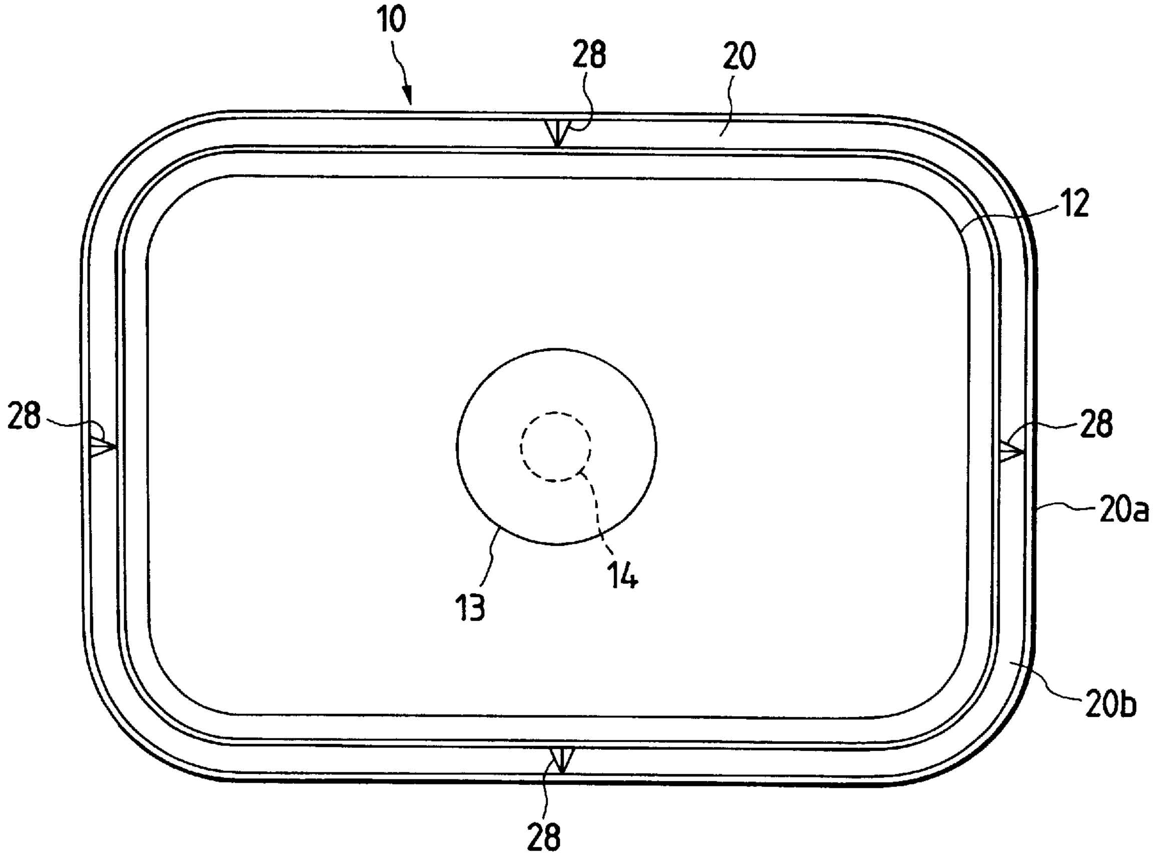
FIG. 4 is a front view of a headlamp without a front lens.
Figure 5:
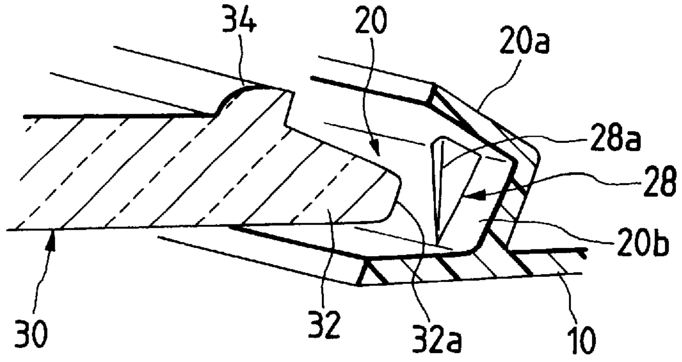
FIG. 5 is an enlarged perspective view of a cross projection in a sealing groove.
Figure 6:
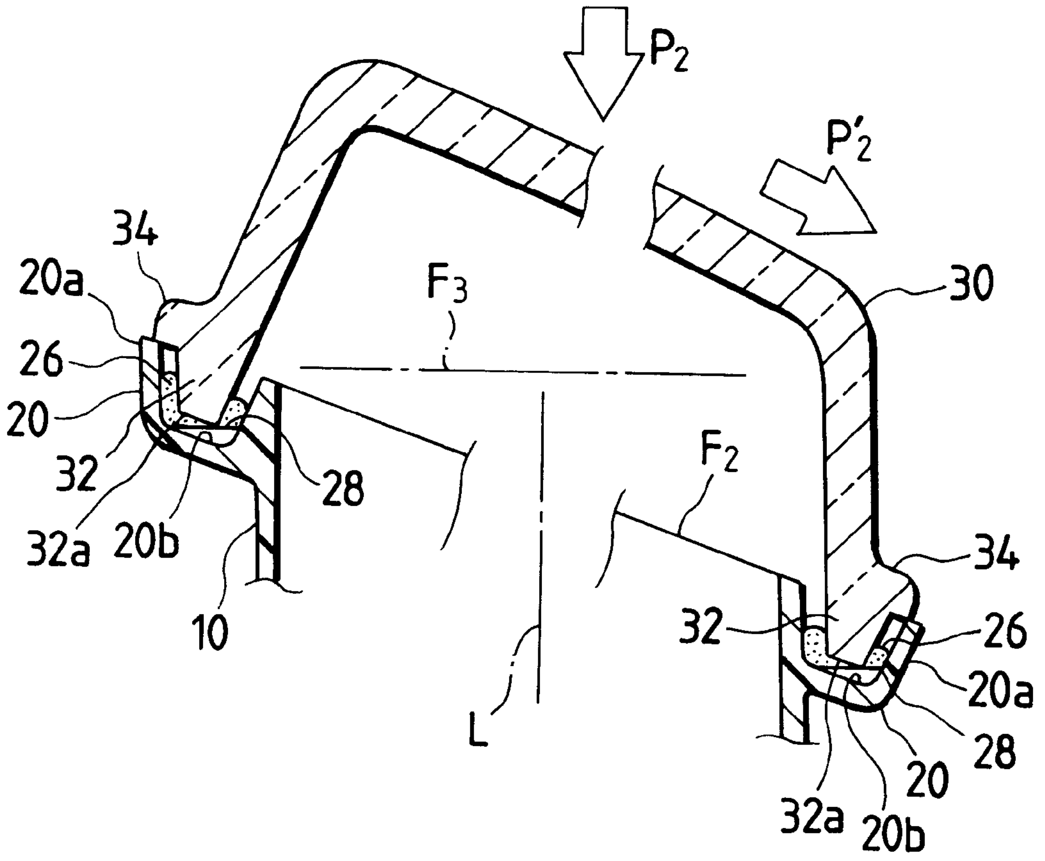
FIG. 6 is a sectional view depicting the way of inserting a sealing leg in the sealing groove.
Figure 7:
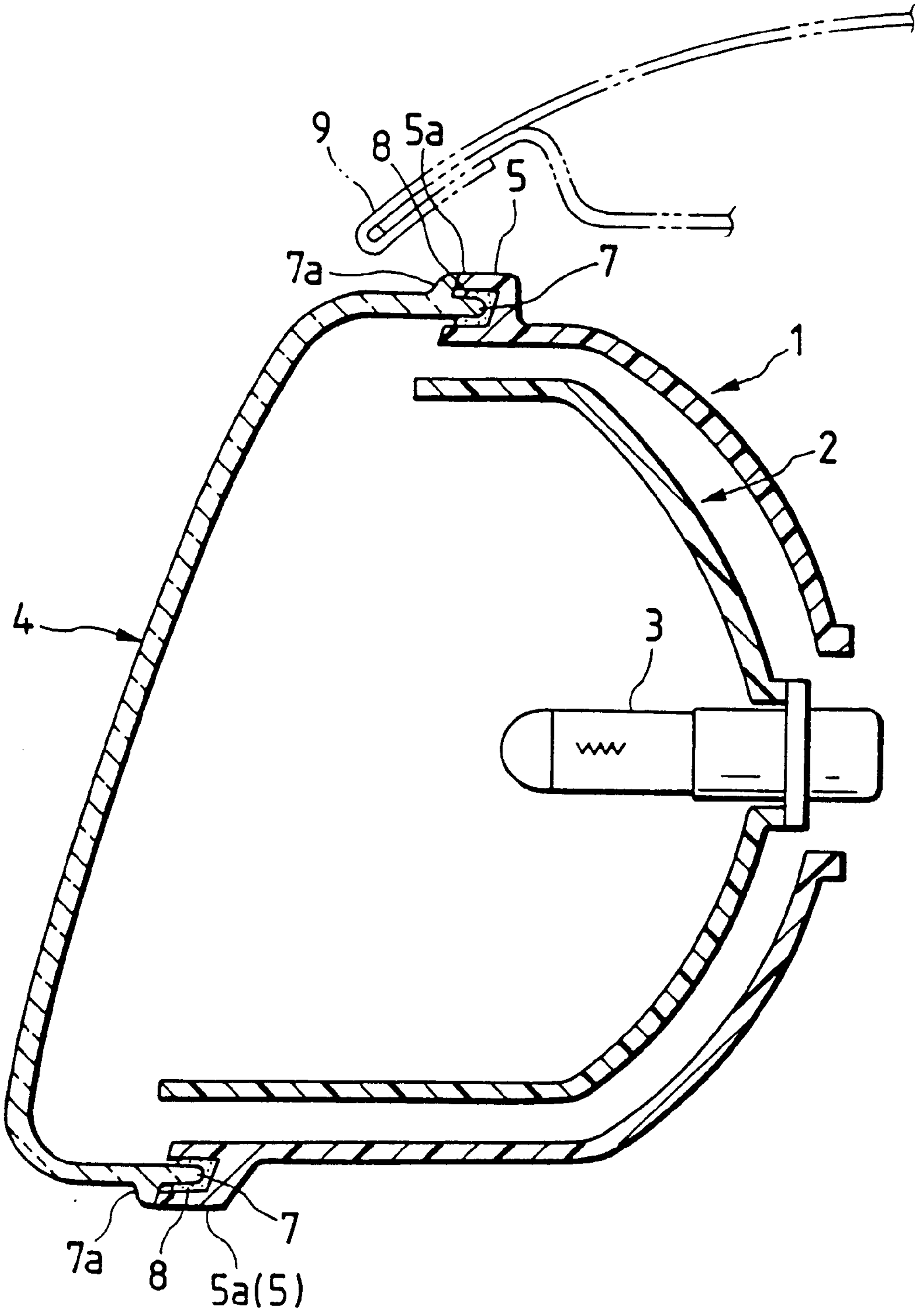
PRIOR ART FIG. 7
FIG. 7 is a sectional view of a conventional automobile headlamp.
Figure 8:
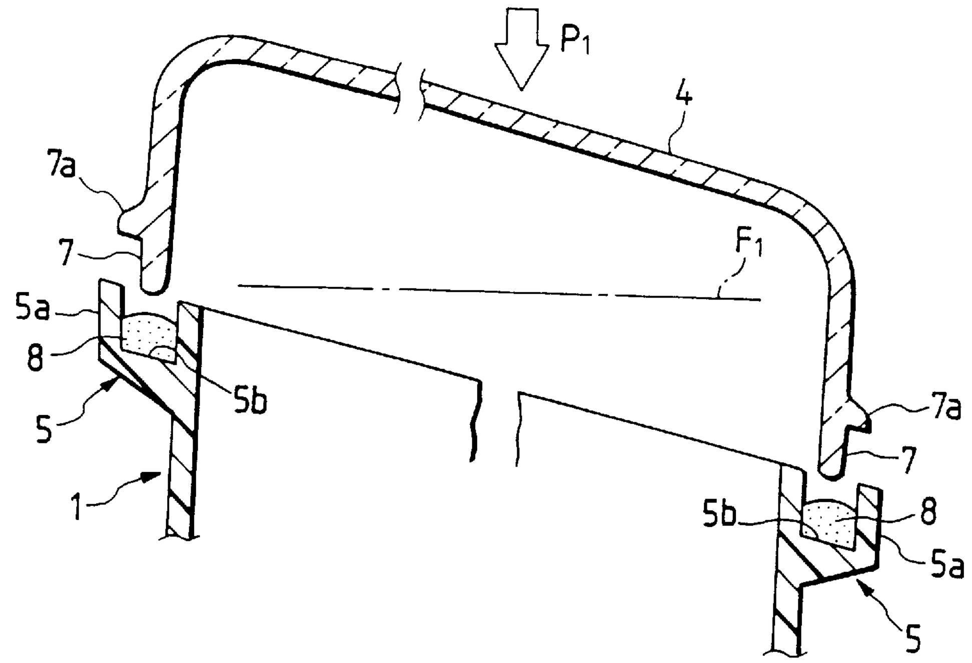
PRIOR ART FIG. 8
FIG. 8 is a sectional view depicting the way of inserting the sealing leg in the sealing groove.

FIGS. 1 to 6 show an automobile headlamp embodying the present invention. FIG. 1 is a front view of the headlamp, FIG. 2 is a vertical sectional view of the headlamp (taken along a line II—II of FIG. 1), FIG. 3 is a transverse sectional view of the headlamp (taken along a line III—III of FIG. 1), FIG. 4 is a front view of the headlamp without a front lens, FIG. 5 is an enlarged perspective view showing a cross projection in a sealing groove, and FIG. 6 is a sectional view showing the way of inserting a sealing leg into the sealing groove.

In these drawings, reference numeral 10 denotes a plastic cup-shaped lamp body in which a reflector 12 with a bulb 14 inserted and mounted therein is supported with an aiming mechanism, which essentially consists of one ball joint A and two aiming screws B, C in such a manner that the reflector 12 is capable of tilting vertically and horizontally. In other words, the optical axis L of the lamp can be made tiltably adjustable vertically and horizontally by the pivotal movement of the aiming screws B, C.

A shade 13 is disposed ahead of the bulb 14 secured to the reflector 12 and used for forming light distribution; and Lx, the horizontally tilting shaft of the reflector 12; LY, the vertically tilting shaft of the reflector 12. A rubber cover 11 is mounted in the rear opening of the lamp body 10, so that the rear of the lamp body 10 is waterproofed.

A sealing groove 20 is provided on the periphery of the front opening of the lamp body 10, whereas a sealing leg 32 is circumferentially provided in the peripheral portion of the back side of a front lens 30, the front lens 30 being incorporated with the lamp body 10 by bringing the sealing leg 32 into engagement with the sealing groove 20 via a sealing material 26. These component parts are thus integrated into a waterproofed headlamp. Reference numeral 31 denotes a light-distribution control step formed on the back of the front lens 30.

A flange portion 34 is provided on the outer side of the sealing leg 32 and the quantity of insertion of the sealing leg 32 is set by bringing the flange portion 34 into contact with the front edge of the outer side wall **20*a* of the sealing groove 20. Furthermore, a clip 36 is mounted between the flange portion 34 and the sealing groove 20 in order to make predetermined compression force act on the sealing material 26 between the sealing leg 32 and the sealing groove 20 and to prevent the sealing leg 32 from slipping off the sealing groove 20**.

The front opening of the lamp body 10 and the front lens 30 largely slope backward and to the right (right-hand side as seen from the driver) so as to follow the configuration of a vehicle body 40 and a region ranging from the headlamp to the vehicle body 40 forms a continuous curved surface, which contributes to decreasing air resistance.

The base **20*b* of the sealing groove 20 formed along the front opening of the lamp body 10 is made parallel to a plane F2 that the front opening of the lamp body 10 forms, so that the depth of the sealing groove 20** is made uniformly in the length and width directions of the sealing groove.

As the flange portion 34 is formed at the root of the sealing leg 32, the length of the sealing leg 32 is also made uniformly in a direction along the peripheral edge of the front lens 30.

Furthermore, as shown in FIGS. 5 and 6, the front edge face **32*a* of the sealing leg 32 is formed in parallel to the base 20*b* of the sealing groove 20 when the sealing leg 32 is brought into engagement with the sealing groove 20, whereby sealing pressure applied in the intersecting direction (direction intersecting the sealing groove 20) of the sealing groove 20** is also made uniformly.

Figure 9:
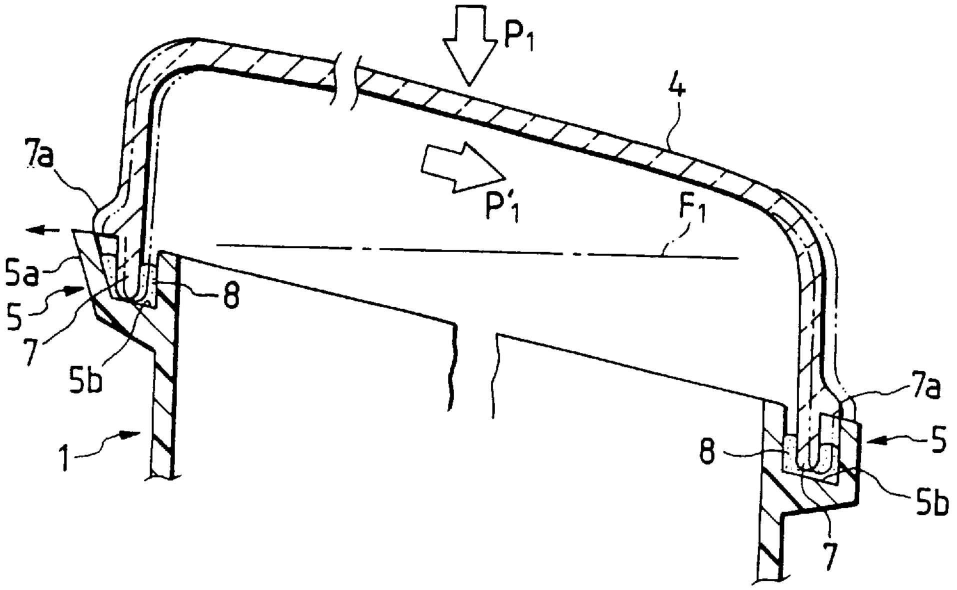
PRIOR ART FIG. 9
FIG. 9 is a sectional view depicting the way of causing the sealing leg to slide in the width direction of the sealing groove.

Moreover, the sealing groove 20 open in a direction parallel to the optical axis L. When the sealing leg 32 is incorporated with the sealing groove 20, the sealing leg 32 is inserted from a direction $P_2$ parallel to the optical axis L. Since the base **20*b* of the sealing groove 20 parallel to the front opening of the lamp body 10 slopes with respect to a plane $F_3$ perpendicularly intersecting the direction $P_2$ in which the sealing leg is inserted, the flange portion 34 forces the outer side wall 20*a* of the sealing groove 20 outward if the sealing leg 32 is forced into the sealing groove 20. Consequently, there is the possibility that as in the case of the prior art shown in FIG. 9, the front end portion of the sealing leg is caused to slide in the width direction (direction $P'_1$ in FIG. 9**) along the base of the sealing leg.

However, cross ribs 28 as cross projections are brought into contact with the front end portion of the sealing leg 32 when the sealing leg is forced in more than necessary are provided on the base **20*b* of the sealing groove 20 according to this embodiment of the invention. Thus, the sealing leg 32 is prevented from inserting into the sealing groove 20** more than necessary or sliding in the width direction of the groove.

More specifically, as shown in FIGS. 1 and 4, the base **20*b* of the sealing groove 20 is fitted with the cross ribs 28 provided at substantially equal intervals in the length direction of the sealing groove. As shown in FIGS. 4 and 5, each cross rib 28 is a projection in the form of a trigonal pyramid provided on the base 20*b* of the sealing groove 20 and a ridgeline 28*a* in the front portion of each cross ribs 28 is set parallel to the plane $F_3$ perpendicularly intersecting the direction P2 of inserting the sealing leg 32 and extended in a direction intersecting the sealing groove 20**.

The front end portion of the sealing leg 32 is brought into contact with the cross ribs 28 and prevented from inserting further even though the sealing leg 32 is forced in to the extent that the outer side wall **20*a* of the sealing groove is deformed. The sealing leg 32 is not inserted into the sealing groove 20** to a degree exceeding a predetermined quantity.

Furthermore, the ridgeline **28*a* in the front portion of each cross rib 28 with which the front end portion of the sealing leg 32 is brought into contact is located on a plane parallel to the plane $F_3$ perpendicularly intersecting the direction $P_3$ of inserting the sealing leg 32 and extended in the direction intersecting the sealing groove 20. Since the whole sealing leg 32 of the front lens 30 is carried by the cross rib 28 at four equally separated places, a component of force applied in the width direction as shown by reference symbol $P'_2$ of FIG. 6 hardly acts even when the sealing leg 32 is forced in. Therefore, the sealing leg 32 never slides along the ridgelines 28***a* (in the width direction of the sealing groove 20) and is always placed in a proper position in the width direction of the sealing groove 20.

Consequently, the sealing material layer between the sealing groove 20 and the sealing leg 32 is so formed as to have uniform thickness along the longitudinal direction of the sealing groove 20 and this makes constant the sealing performance along the sealing groove 20.

Although the sealing material layer in the position where the cross ribs 28 becomes extremely thin as the cross ribs 28 are kept close to the front edge face 32*a* of the sealing leg 32, the thin sealing material layer is limited to only a region facing the ridgelines 28*a* of the cross ribs 28 and the sealing performance between the sealing leg 32 and the sealing groove 20 remains unaffected.

Only a very small gap is left between the front end portion of the sealing leg 32 and each cross rib 28 in such a state that the front lens 30 has thus been incorporated integrally with the front opening of the lamp body 10 and the sealing material layer is formed between the front edge face 32*a* of the sealing leg and the cross rib 28 according to the present embodiment of the invention. However, the sealing leg 32 may be arranged so that the sealing leg 32 is brought into right contact with the cross rib 28.

The cross ribs 28 are thoroughly formed on the base of the vertical and horizontal sealing groove since the base of the vertical and horizontal sealing groove in cross section holding the front opening of the lamp body 10 slopes with respect to the plane intersecting the direction of inserting the sealing leg according to the aforesaid embodiment of the invention. However, in a case where the horizontal base of the sealing groove in cross section is not sloped but only the base of the vertical sealing groove in cross section is sloped, for example, the cross ribs 28 may be formed on only the vertical sealing groove; that is, the cross ribs 28 may be formed on only the inclined sealing groove in cross section.

Although a description has been given of the headlamp of the reflector movable type in which the reflector 12 fitted with the bulb as a light source is tiltably supported in the aforesaid embodiment of the invention, the invention also applicable to bringing a lamp body into engagement with a front lens which constitute a lamp unit of a lamp unit movable type in which a reflector is incorporated in a lamp body so that a bulb as a light source is tiltably supported with a lamp housing.

Although a description has been given of bringing the front lens into engagement with the lamp body with the headlamp by way of example in the aforesaid embodiment of the invention, the invention is also applicable of bringing a front lens into engagement with a lamp body in any other vehicle lamp.

As is obvious from the description given above, the sealing leg inserted into the sealing groove of the vehicle lamp according to the present invention is not caused to slide in the width direction of the groove as the sealing leg is brought into contact with the cross projections which are provided on the base of the sealing groove and perpendicularly intersect the direction of inserting the sealing leg even though forced in more than necessary and always settled in a proper position in the width direction of the sealing groove. Consequently, nonconformity including forcing out the sealing material, deteriorating sealing performance, disturbing light distribution and the like are prevented.

According to the invention, further, sealing performance in the sealing groove is improved since the thickness of the sealing material layer between the sealing leg and the sealing groove is made uniformly in the cross directional direction of the sealing groove.

According to the invention, furthermore, the sealing leg is surely settled in a proper position in the width direction of the sealing groove since both sides of the sealing leg holding the front opening of the lamp body therebetween is supported with the cross projections.

Moreover, the problems accompanying the conventional art including forcing the sealing material out of the sealing, deteriorating sealing performance, disturbing light distribution and the like are certainly obviated since the sealing leg is surely settled in a proper position of the sealing groove by means of the flange portion on the sealing leg side together with the outer side wall of the sealing groove, and the sealing leg together with the cross projections in the sealing groove for positioning purposes.

Further, though the sealing material layer becomes thin in the position where each of the cross projections is formed, the thin region of the sealing material layer is limited to the position where the cross projection is formed and to a region along one straight line intersecting the sealing groove, whereupon the provision of the cross projections may not result in deteriorating sealing performance to ensure that sealing performance equal to what results from providing no cross projections can be secured.

What is claimed is:

1. A vehicle lamp comprising:

a lamp body having inclined front opening for housing therein a light source, said lamp body comprising a sealing groove formed circumferentially in the inclined front opening;

a front lens coupled to the front opening of the lamp body, said front lens comprising a sealing leg which engages integrally with the sealing groove, the base of the sealing groove in cross section sloping with respect to a plane perpendicularly intersecting the direction of inserting the sealing leg;

a sealing material applied to the sealing groove; and cross projections in the form of trigonal pyramids whose ridgeline directs toward the opening of the sealing groove, said cross projections being disposed on the inclined base perpendicularly intersecting the direction of inserting the sealing leg and extending in the direction of intersecting the sealing groove in order to prevent the sealing leg from sliding in the width direction of the sealing groove.

* * * * *